United States Patent [19]

Nunes

[11] 4,344,389

[45] Aug. 17, 1982

[54] FUEL/AIR MIXING DEVICE

[75] Inventor: Anizio G. R. Nunes, Johannesburg, South Africa

[73] Assignee: Automotive Invention Researchers (Pty) Limited, Johannesburg, South Africa

[21] Appl. No.: 128,898

[22] Filed: Mar. 10, 1980

[30] Foreign Application Priority Data

Jan. 21, 1980 [ZA] South Africa .................. 80/0328

[51] Int. Cl.³ .................................... F02D 19/00
[52] U.S. Cl. ........................ 123/25 B; 123/25 R; 123/549; 261/18 A
[58] Field of Search ............ 123/25 A, 25 B, 25 D, 123/25 R, 25 L, 549; 261/18 A

[56] References Cited

U.S. PATENT DOCUMENTS

| | | | |
|---|---|---|---|
| 3,606,868 | 9/1971 | Voogd | 123/25 R |
| 4,005,683 | 2/1977 | Whitt | 123/25 B |
| 4,114,566 | 9/1978 | Harpman et al. | 123/25 B |
| 4,166,435 | 9/1979 | Kiang | 123/25 B |
| 4,259,021 | 3/1981 | Goudy, Jr. | 123/25 B |

FOREIGN PATENT DOCUMENTS 263529 12/1926 United Kingdom .
258866 8/1927 United Kingdom .
726534 3/1935 United Kingdom .

*Primary Examiner*—Charles J. Myhre
*Assistant Examiner*—E. Rollins Cross
*Attorney, Agent, or Firm*—Browdy & Neimark

[57] ABSTRACT

A carburetor comprises an air passage containing a hollow toroid having nozzles therein from which fuel/water is injected into the air passage along the periphery thereof. Both the fuel and the water are fed from the pumps and needle valves and respectively control fuel and water flow to the toroid. The position of one fuel control needle valve is determined by the vacuum in the air passage and that of the other fuel control needle valve by the setting of the butterfly valve. An overflow line leads away excess fuel that cannot pass the fuel needle valves.

13 Claims, 4 Drawing Figures

FUEL/AIR MIXING DEVICE

This invention relates to internal combustion engines.

The invention is concerned with a fuel/air mixing device for such engine.

According to one aspect of the invention there is provided a fuel/air mixing device comprising a body, an air passage passing through the body and being adapted to be connected to supply a fuel/air mixture to the inlet manifold of an internal combustion engine, chamber means in which gasoline and water can be mixed, separate fuel and water inlets to the chamber means, and liquid inlet nozzle means at or near the periphery of the air passage through which in use the fuel liquid mixture from the chamber means may be supplied to the air passage.

The chamber means is preferably an annular chamber at or near the periphery of the air passage, being formed conveniently either in the body about the air passage or in a hollow toroid located within the air passage.

Preferably there is provided means for warming the air being supplied to the chamber means.

Preferably there is provided control means for increasing the heat supply to warm the air when the demand for the fuel/air mixture increases. The heating means preferably comprises electrical heating means. The mixing device preferably includes a butterfly valve for controlling the supply to the inlet manifold and preferably the butterfly valve is connected to variable resistance means to vary the electrical supply to the heater.

The fuel supply preferably passes through two apertures controlled respectively by two needle valves, the opening of one needle valve being determined by the vacuum in the passage and the other by the opening of the butterfly valve. A fuel return line is preferably provided so as to return excess fuel, movement of which is inhibited by the needle valve when in the closed position, back to a gasoline reservoir.

Both the water and the fuel are preferably supplied under pressure by suitable pump means and preferably control devices, conveniently in the form of needle valves, are provided to control the flow of the liquids within the device.

An embodiment of the invention will now be described by way of example with reference to the accompanying drawings.

Figure 1:
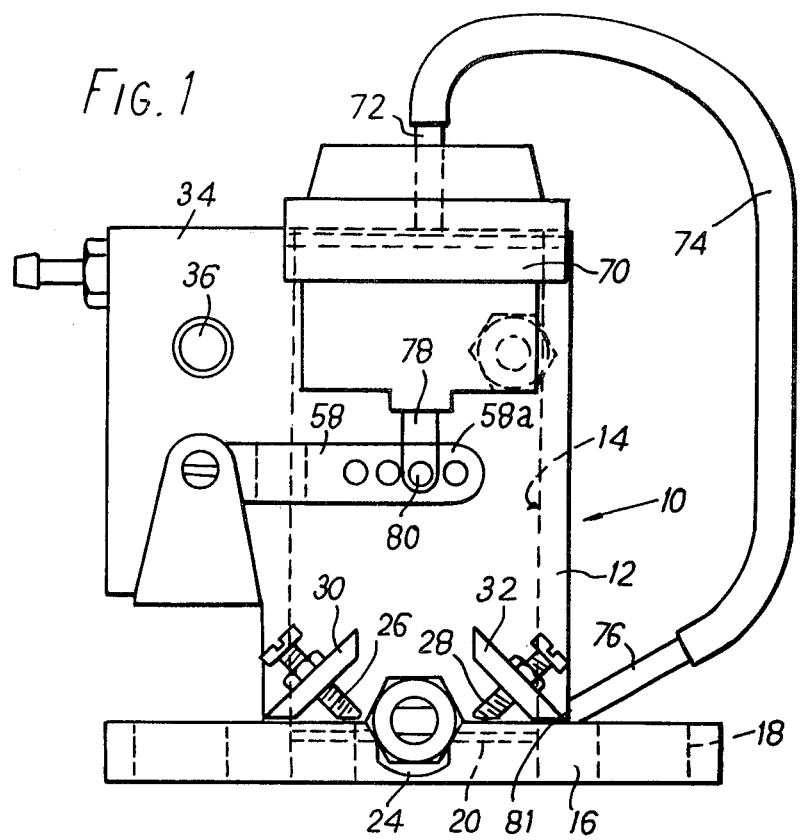
FIG. 1 is a side view of a mixing device of the invention.
Figure 2:
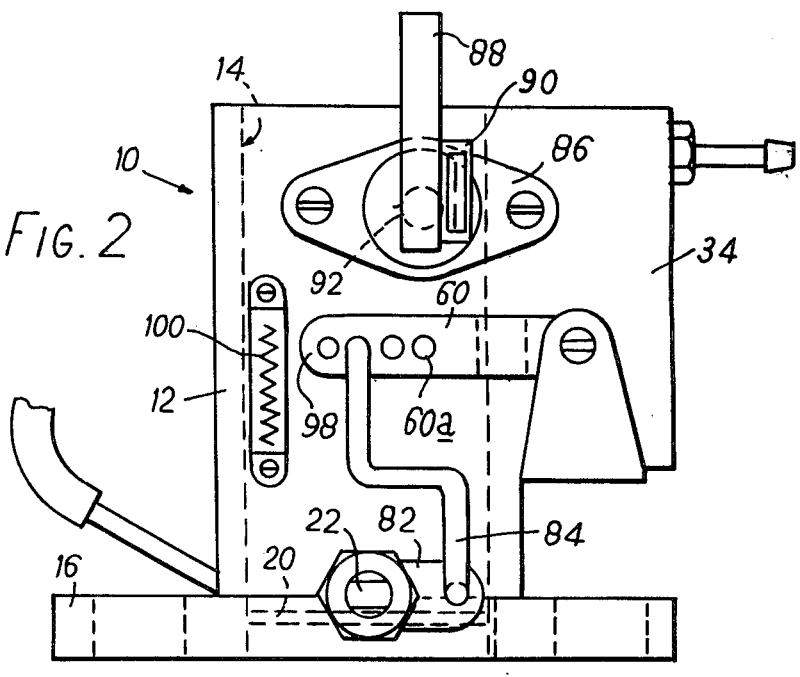
FIG. 2 is a side view from the opposite direction of the mixing device.
Figure 3:
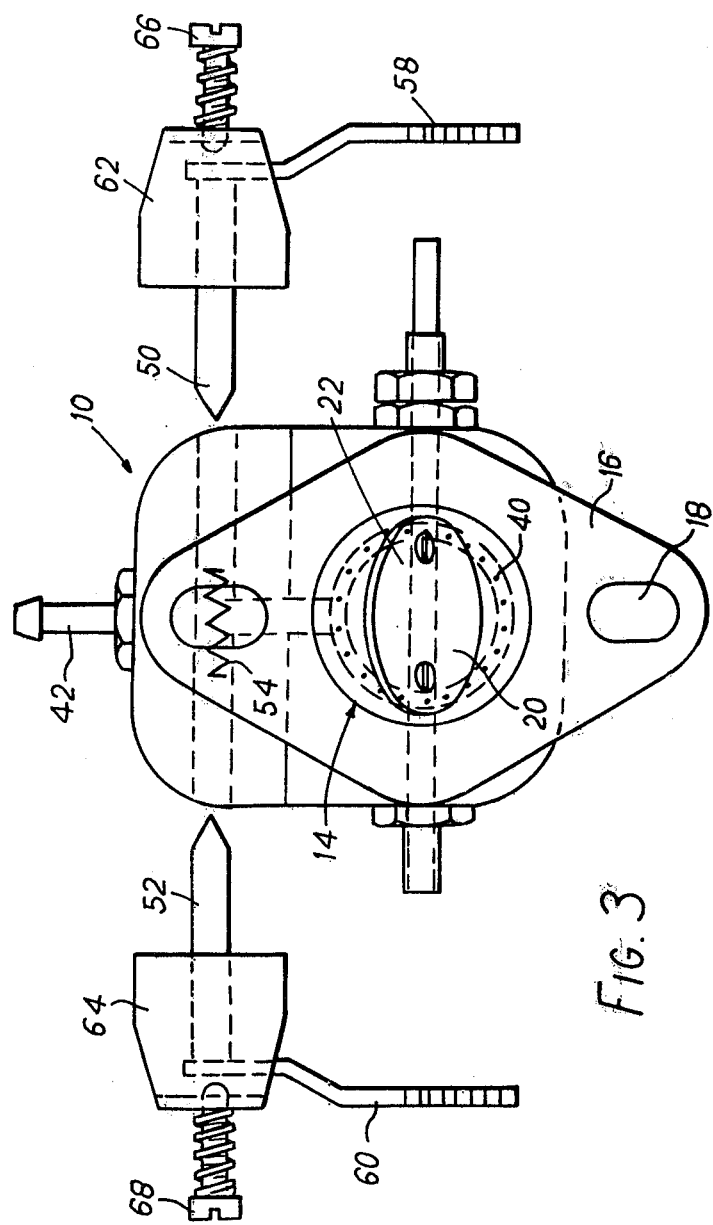
FIG. 3 is an under plan view of the device.

Referring now to FIGS. 1 to 3 there is shown a mixing device 10 of the invention. The device 10 comprises a main body 12 through which passes an air/fuel supply passage 14. At its lower end the body 12 is provided with a flange 16 having suitable bolt holes 18 whereby it may be secured to the inlet manifold of a gasoline fueled spark ignition engine of a motor vehicle (both not shown). Air is supplied preferably through an air filter (not shown) in conventional manner. At its lower end the passage 14 is provided with a butterfly valve 20 mounted on a pivot shaft 22 which is connected by a linkage (not shown) to the accelerator pedal of the vehicle. Mounted on the shaft 22 is an eccentric member 24 which is engagable by the ends of screw stop members 26 and 28 passing through plates 30 and 32 respectively on the body 12 and being adjustable to limit the movement of the eccentric member 24 and hence the butterfly valve 20.

On one side, the body 12 has an enlargement 34. A gasoline inlet 36 is provided on this enlargement through which gasoline is supplied into an internal space 38 (see FIG. 4) which is connected to a liquid supply toroid 40 by means to be described. The space 38 also is connected to a gasoline return nipple 42 for recycling gasoline to the gasoline tank. The space 38 has a pair of ports 44 and 46 leading therefrom into a control passage 48. The sum of the cross-sectional areas of the passages 44 and 46 is equal to the cross-sectional area of the outlet pipe 42. Within the control passage 48 are two needle valves 50 and 52 having eccentric conical ends and which control respectively the ports 44 and 46. A spring 54 acts between the ends of these needle valves 50 and 52. An outlet port is provided in the control passage 48 leading to a gasoline passage 56 that leads to the toroid 40.

The needle valves 50 and 52 are carried respectively by levers 58 and 60 which pivot about the needle valve axes. Lugs 62 and 64 carry respectively adjusting screws 66 and 68 that act respectively on the needle valves 50 and 52 to move these inwardly and outwardly thereby controlling the setting of these valves. Each lever 58 and 60 is provided with four connecting holes 58a and 60a so that the control devices therefor (which will be described) can be connected at any desired distance away from the pivot axis of the lever.

Mounted on one side of the body 12 is a diaphragm operated lifter device 70 (shown only in FIG. 1). The device 70 has an inlet pipe 72 which is connected via flexible tubing 74 to a metal tube 76 brazed onto the body 12 and leading to a port 81 in the passage 14 at the level of the butterfly valve 20. The lifter device 70 has a piston rod or leg 78 connected to the diaphragm (not shown) in conventional manner and being secured by means of a pin 80 in one of the holes 58a in the lever 58.

A short lever 82 is mounted on the butterfly valve shaft 22. This lever 82 is connected by a "S"-shaped rod member 84 to one of the holes 60a in the lever 60.

The connection between the lifting device 70 and link 58 is such that when there is maximum vacuum in the passage 14, the needle valve 50 will be so rotated that it will permit the maximum gasoline flow through the port 44 and hence the toroid 40. Conversely when there is minimum or no flow through the passage 14 there will be minimum or no flow through the passage 44. The connection between the levers 82 and 60 is such that when the butterfly valve 20 is opened to its maximum extent the needle valve 52 will permit the maximum gasoline flow through the port 46 and conversely when the butterfly valve is closed or substantially closed there will be no or little gasoline flow through the passage 46. Bolted onto the projection 34 of the body 12 on the side thereof opposite to the gasoline inlet 36 is a water inlet control device 86. This device 86 includes a jacketted water pipe 88 and within this jacket there is a heating coil (indicated generally at 90) to heat such water. Water from the device 86 enters into a bore 92 in the body 12. A valve 94 is provided to vary the flow area through the passage 92. The passage 92 is connected to the hollow toroid 40 diametrically opposite to the passage 56. A suitable overflow valve (indicated generally at 96) is provided in the passage 92 to return excess water from the passage 92 upstream of the needle valve 94 to the tank.

One terminal of the heating coil 90 is grounded to the body 12, the other terminal of the coil 90 is connected to a moving contact 98 of a potentiometer 100 that is connected to the motor vehicle battery (not shown). The moving contact 98 is mounted on the lever 60 to be movable therewith. A relay control switch (not shown) is provided in the line between the potentiometer 100 and the vehicle battery. This control switch is operable so that the connection between the potentiometer 100 and the vehicle battery will be broken except when e.g. the ignition switch is turned into the operative condition.

The toroid 40 is provided on its inner side with about eight pin hole size apertures equi-spaced thereabout through which the water/gasoline mixture can be discharged into the passage 14.

The heater 90 is arranged so that it will raise the temperature of the water being supplied to the toroid 40 slightly, of the order of five degrees Celsius.

The water and gasoline supply will both be provided with conventional water and gasoline pumps in the usual way.

In use the screws 66 and 68 will be adjusted to set the position of the needle valves 50 and 52 respectively. Similarly, the needle valve 94 will be adjusted for the appropriate supply of water. On switching on the engine electrical power will be supplied to the heater 90. As the accelerator pedal is depressed the butterfly valve 20 will be opened and at the same time the lever 60 will be rotated in a clock-wise direction (as shown in FIG. 2). This has the effect of minimizing the resistance of the potentiometer 100 so that the heating coil increases its heat to accomodate the excess flow of water therealong. At the same time the needle valve 52 will be so moved that the passage 46 will be in the opened position. Thus a rich mixture of gasoline will be supplied to the toroid and hence into the passage 14 for onward transmission to the inlet manifold of the engine.

At the same time the vacuum in the passage 14 will be increased thereby causing the device 70 to rotate the lever 58 in a counter-clockwise direction (as shown in FIG. 1) and hence causing the needle valve 50 to permit maximum gasoline flow through the passage 44.

Once the engine is running the butterfly valve will be moved to an appropriate running position and the positions of the needle valves 50 and 52 will be adjusted accordingly. If the passage 44 and 46 are obturated to such a degree that the gasoline being supplied cannot pass therethrough, this gasoline will escape via the passage 48 as described above.

It has been found that the above described mixing device 10 when connected to a conventional spark ignition internal combustion engine in a motor vehicle will give considerably improved gasoline consumption as compared to the gasoline consumption obtained with a conventional carburator. Furthermore the device 10 gives a better consumption than even fuel injection engines of the same size. This improved consumption, it has been found, occurs without any loss of power.

It is not entirely certain why the mixing device 10 gives the improved consumption figures. It is believed however, that the mixture of water and gasoline as supplied to the engine results in a much improved combustion and indeed it has been noted in test vehicles using a mixing device 10 that the exhaust gasses are exceptionally clean which would seem to indicate very efficient usage of the gasoline. Further it is believed that there may well be some chemical reaction causing the improved combustion.

It is further believed that the heating of the water is of great importance. In tests which have been carried out where the water was not heated improved consumption results were achieved but these were not as good as those when the inlet water was heated. This would seem to indicate that such heating is highly desirable (although possibly not essential).

This invention is not limited to the precise constructional details hereinbefore described and illustrated in the drawings. For example, the toroid may be replaced by an annular chamber cut into the body 12 about the air passage 14 and having an appropriate number of pin hole nozzles for the gasoline/water mixture to enter into the passage 14. The number of such nozzles both in the modification and in the particular example as described above may be varied as desired. Also suitable protective housings may be provided particularly on the side of the device 10 illustrated in 2 to protect inter-alia the potentiometer 100.

Figure 4:
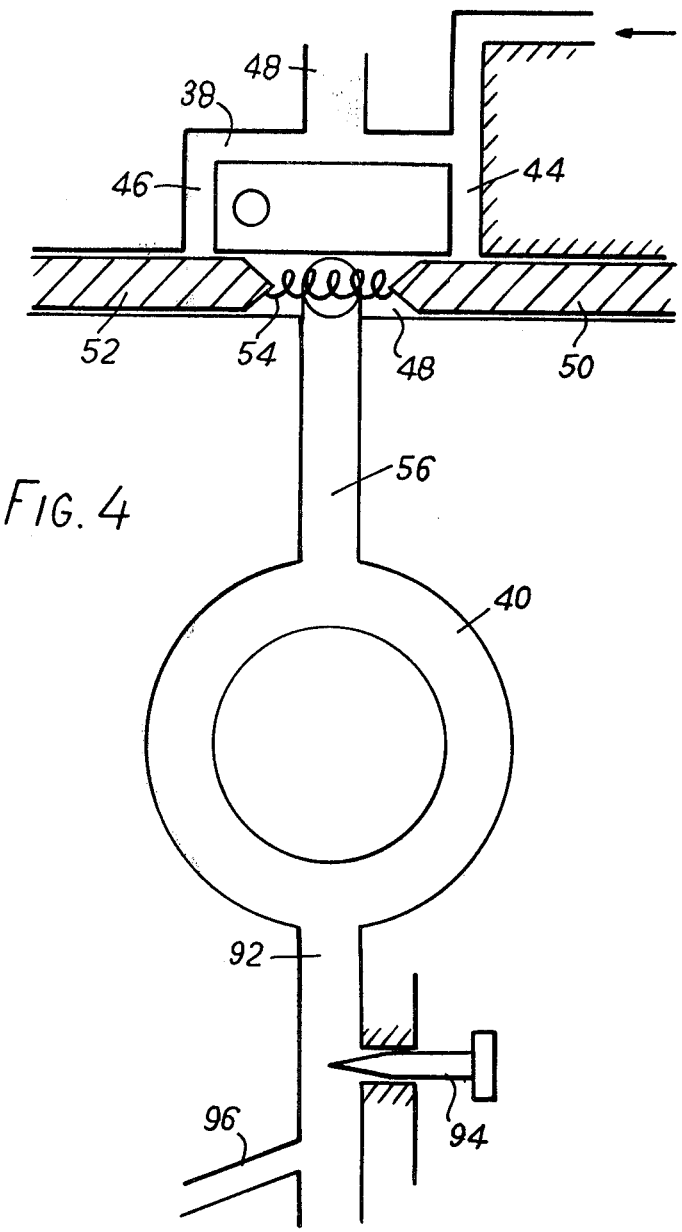
FIG. 4 is a schematic liquid flow diagram.

Finally it should be pointed out that the drawings are very diagrammatic in that, inter-alia, certain parts are omitted. The various passages illustrated in FIG. 4 are not always clearly shown in FIGS. 1 to 3.

I claim:

1. A fuel/air mixing device comprising:
   a body;
   an air passage passing through the body and being adapted to be connected to supply a fuel/air mixture to the inlet manifold of an internal combustion engine;
   chamber means in which gasoline and water can be mixed;
   separate fuel and water lines to the chamber means;
   liquid inlet nozzle means adjacent the periphery of said air passage through which the fuel/liquid mixture from said chamber means may be supplied to said air passage when in use;
   first valve means for controlling the passage of the fuel/air mixture from said air passage to the inlet manifold of an internal combustion engine; and
   second valve means for controlling the fuel supply to said air passage via said chamber means, which defines two apertures through which fuel can pass, such passage of fuel being controlled respectively by needle valves, the opening and closing of one said needle valve being determined by the vacuum created in said air passage and the other needle valve being controlled by the position of said first valve means.

2. A fuel/air mixing device as claimed in claim 1, in which said first valve means is a butterfly valve.

3. A fuel/air mixing device as claimed in claim 1 wherein said chamber means is annular and is located at or near the periphery of said air passage.

4. A fuel/air mixing device as claimed in claim 3, wherein said chamber means is formed in the body about said air passage.

5. A fuel/air mixing device as claimed in claim 3, wherein said chamber means is formed in a hollow toroid located within the air passage.

6. A fuel/air mixing device as claimed in claim 1 wherein heating means are provided for warming the water being supplied to said chamber means.

7. A fuel/air mixing device as claimed in claim 6, wherein said heating means comprises electrical heating means.

8. A fuel/air mixing device as claimed in claim 6 or 7, wherein control means are provided for regulating said heating means.

9. A fuel/air mixing device as claimed in claim 7, in which said first valve means is connected to a variable resistence means to vary the electrical supply to said heating means in dependance upon the setting of said first valve means.

10. A fuel/air mixing device as claimed in claim 1, wherein a fuel return line is provided connected to said second valve means for returning excess fuel passing through said second valve means.

11. A fuel/air mixing device as claimed in claim 10, wherein said fuel return line extends to return excess fuel to a gasoline reservoir.

12. A fuel/air mixing device as claimed in claim 1, further including a control device in said water supply line.

13. A fuel/air mixing device as claimed in claim 12, wherein said control device is a needle valve.

* * * * *